(No Model.)

B. C. SMITH.
APPARATUS FOR TRANSFERRING WOOD GRAINING.

No. 248,517. Patented Oct. 18, 1881.

WITNESSES:
Chas. Nida
C. Sedgwick

INVENTOR:
B. C. Smith
BY Munn & Co
ATTORNEYS.

UNITED STATES PATENT OFFICE.

BENJAMIN C. SMITH, OF SEARSPORT, MAINE.

APPARATUS FOR TRANSFERRING WOOD-GRAINING.

SPECIFICATION forming part of Letters Patent No. 248,517, dated October 18, 1881.

Application filed July 2, 1881. (No model.)

*To all whom it may concern:*

Be it known that I, BENJAMIN C. SMITH, of Searsport, in the county of Waldo and State of Maine, have invented a new and Improved Apparatus for Transferring Wood-Graining, of which the following is a specification.

Figure 1:
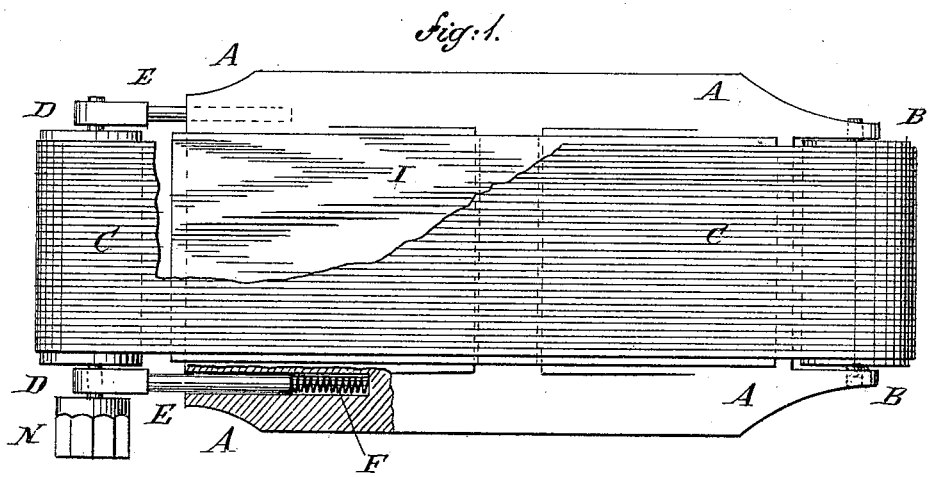
Figure 2:
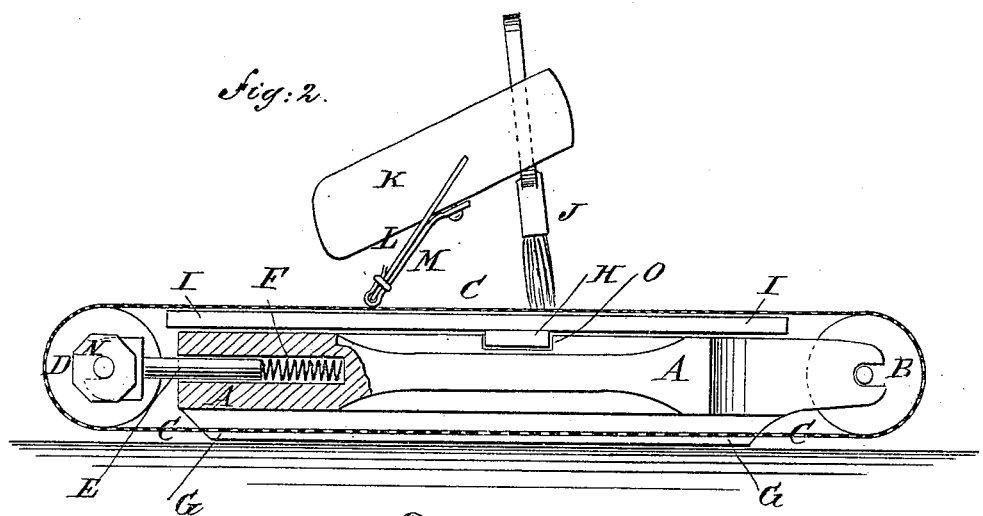
Figure 3:
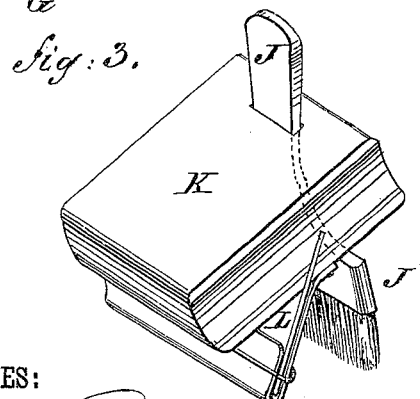

In the accompanying drawings, Figure 1 is a plan view of my improvement, parts being broken away. Fig. 2 is a side elevation of the same, partly in section. Fig. 3 is a perspective view of the brush, scraper, and holder.

Similar letters of reference indicate corresponding parts.

The object of this invention is to facilitate the transferring of the natural graining of wood to any desired surface.

The invention consists in an apparatus for transferring wood-graining, constructed of a plate, a roller pivoted to one end of the plate, an elastic roller pivoted at the other end of the plate to eye-rods pressed outward by springs, an endless band, a brush, and a rubber-faced plate attached to a holder, and a pattern interposed between the plate and the endless band, as will be hereinafter fully described.

In the drawings, A represents a block or plate of wood or other suitable material, two feet (more or less) in length, and six inches (more or less) in width. To and between lugs formed upon or attached to one end of the plate A is pivoted a roller, B, of rubber, or other suitable elastic material, around which passes a band, C, of cloth or other suitable material coated with rubber. The band C also passes around a roller, D, of wood or other suitable material, placed at the other end of the plate A, and pivoted to the eyes formed in the outer ends of rods or pins E. The rods E are placed in holes in the end of the plate A, with their inner ends resting against the ends of spiral springs F, placed in the said holes, the elasticity of which presses the rods E and roller D outward to keep the band C taut.

Upon the side parts of the lower side of the plate A are formed flanges G, of sufficient height to keep the band C from contact with any surface upon which the said plate A may be laid. The upper surface of the plate A is flat, and has a cross-groove, o, formed in its middle part to receive the cross-strip H, attached to the lower side of the pattern I, to keep the said pattern I in place and prevent it from moving when laid upon the plate A and being used.

The pattern I is formed by smoothing a piece of distinctly-grained thin board of the proper length and width when green and then drying it. The shrinking of the board while being dried makes the graining more prominent. The pattern I can also be prepared by engraving or otherwise forming any desired design upon a plate or block of wood or other material. The color is applied to the outer surface of the band C with a brush, J, which, for convenience, I prefer to attach to a holder, K. To the holder K is also attached, in an inclined position, a thin plate, L, of metal or other suitable material, which has its lower edge covered with a sheet, M, of rubber, so that the band C will be pressed upon and into the interstices or forms of the pattern, and a copy of the pattern will be formed in color upon the face or outer surface of the said band, ready to be transferred to the surface to be grained.

The side edges of the holder K can be grooved for convenience in holding it, and for the same reason the projecting side edges of the plate A can be thinned or concaved upon their upper and lower sides.

In using the apparatus the desired pattern I is selected and secured in place upon the upper side of the plate A. The color is then applied to the band C with the brush J, and the said band is scraped or rubbed with the rubber-faced edge of the metal plate L, which removes the color over the projecting parts of the pattern and leaves it over the depressed parts of the said pattern, forming a copy of the graining of the pattern in color upon the band C. The band C is moved along the upper side of the plate A by turning the roller D by means of a small hand wheel or knob, N, attached to one of the journals of the said roller D. When the entire outer surface of the band C has received a copy of the pattern the roller B is placed against the surface to which the graining is to be transferred, and the plate A is moved along the said surface, transferring the copy of the graining from the band C to the said surface, the friction causing the roller B to revolve, and thus bring all parts of the band against the said surface, so that at each operation a strip of graining will be applied to the surface twice the length of the plate A.

In this apparatus the color is always applied to the band C, and never to the pattern or block I, so that the depressions of the said pattern can never become filled, and the pattern can be used an indefinite number of times, giving as good an impression the last time as it did the first.

Having thus fully described my invention, I claim as new and desire to secure by Letters Patent—

1. An apparatus for transferring wood-graining, constructed substantially as herein shown and described, consisting of the plate A, the elastic roller B, the endless band C, and the roller D, carried upon spring-pressed rods E, as set forth.

2. In an apparatus for transferring wood-graining, the combination, with the plate A, carrying the elastic roller B and the roller D, of the eye-rods E and springs F, substantially as herein shown and described, whereby the band C is kept taut when the elastic roller is compressed in transferring graining, as set forth.

3. The combination, with the endless band C, of the design-plate I, the brush J, the holder K, the inclined plate L, and the rubber sheet M, as and for the purpose specified.

BENJ. C. SMITH.

Witnesses:
JAMES G. PENDLETON,
J. W. BLACK.